(12) United States Patent
Wankmueller

(10) Patent No.: US 8,572,704 B2
(45) Date of Patent: Oct. 29, 2013

(54) METHODS AND SYSTEMS FOR USER AUTHENTICATION

(75) Inventor: John R. Wankmueller, Great Neck, NY (US)

(73) Assignee: Mastercard International Incorporated, Purchase, NY (US)

( * ) Notice: Subject to any disclaimer, the term of this patent is extended or adjusted under 35 U.S.C. 154(b) by 781 days.

(21) Appl. No.: 12/541,464

(22) Filed: Aug. 14, 2009

(65) Prior Publication Data

US 2011/0041170 A1 Feb. 17, 2011

(51) Int. Cl.
*H04L 29/06* (2006.01)
(52) U.S. Cl.
USPC .......................................................... 726/7
(58) Field of Classification Search
USPC ............................................................ 726/2
See application file for complete search history.

(56) References Cited

U.S. PATENT DOCUMENTS

| 8,151,343 | B1 * | 4/2012 | Wang et al. ................... 726/19 |
| 2003/0154406 | A1 * | 8/2003 | Honarvar et al. ............. 713/201 |
| 2008/0185429 | A1 * | 8/2008 | Saville ......................... 235/380 |
| 2009/0106134 | A1 * | 4/2009 | Royyuru ....................... 705/35 |
| 2009/0178120 | A1 * | 7/2009 | Royyuru et al. ............... 726/4 |
| 2010/0199338 | A1 * | 8/2010 | Craddock et al. .............. 726/7 |

* cited by examiner

*Primary Examiner* — Shaun Gregory
(74) *Attorney, Agent, or Firm* — Buckley, Maschoff & Talwalkar LLC

(57) ABSTRACT

According to some embodiments, a registration request is received from a user, the user providing information identifying an account. A transaction database is queried using the information identifying an account, and a set of transactions conducted using the account are identified, each of the transactions having at least one transaction detail field. The set of transactions is presented to said user with at least one of the transaction detail fields being redacted. The user is prompted to provide the at least one of the redacted transaction detail fields, and a determination is made whether to authenticate the user based on a response of the user.

18 Claims, 8 Drawing Sheets

| ACCOUNT IDENTIFIER 502 | ACCOUNT OWNER 504 | TRANSACTION IDENTIFIER 506 | TRANSACTION DATE 508 | MERCHANT 510 | MERCHANT CATEGORY 512 | TRANSACTION AMOUNT 514 |
|---|---|---|---|---|---|---|
| 5555-5555-5555 | John Doe | T1223445 | 05/12/2009 | CVS | Drug Store | $23.97 |
| 5555-5555-5555 | John Doe | T1234323 | 05/13/2009 | Starbucks | Restaurant | $5.95 |
| 5555-5555-5555 | John Doe | T2343234 | 05/17/2009 | | Transportation | $127.80 |
| 5555-5555-5555 | John Doe | T2234234 | 05/21/2009 | Joes Diner | Restaurant | $15.19 |
| 5555-5555-5555 | John Doe | T2348923 | 05/23/2009 | Amazon.com | Internet Retailer | $97.25 |
| 5434-2432-2342 | Jane Smith | T2343223 | 05/22/2009 | Smiths | Grocery | $83.23 |
| ... | | | | | | ... |

METHODS AND SYSTEMS FOR USER AUTHENTICATION

FIELD

The present invention relates to user authentication. In particular, the present invention relates to systems and methods for authenticating a user substantially in real-time using an account identifier and historical transaction information associated with the user.

BACKGROUND

As the Internet and other forms of remote communication become more prevalent, more and more service providers are allowing new customers or users to register for access to products or services remotely. Frequently, users are asked to enroll one of their existing financial accounts into a back end system. For example, a user may want to link a credit card account to an Internet service (such as PayPal®). As another example, a user may wish to associate their checking account with a service (such as a rewards system, PayPal® or the like). Prior to allowing such association, service providers must accurately and carefully authenticate the user and the user's right to access the account to be associated.

A number of techniques have been used for such authentication. For example, when a PayPal® customer wishes to link a bank account to his or her PayPal account, PayPal requires that the user authenticate their ownership of the bank account by confirming two small deposit amounts that are made by PayPal into the user's bank account. By confirming the amounts, the user authenticates her ownership or access to the bank account. Unfortunately, such authentication takes time (sometimes up to several days after the user requested access to the new financial service).

It would be desirable to provide systems and methods that would allow user authentication to be performed substantially in real-time during the course of a registration transaction.

BRIEF DESCRIPTION OF THE DRAWINGS

FIG. 5 is a portion of a tabular representation of a transaction database according to some embodiments.

DETAILED DESCRIPTION

Figure 1:
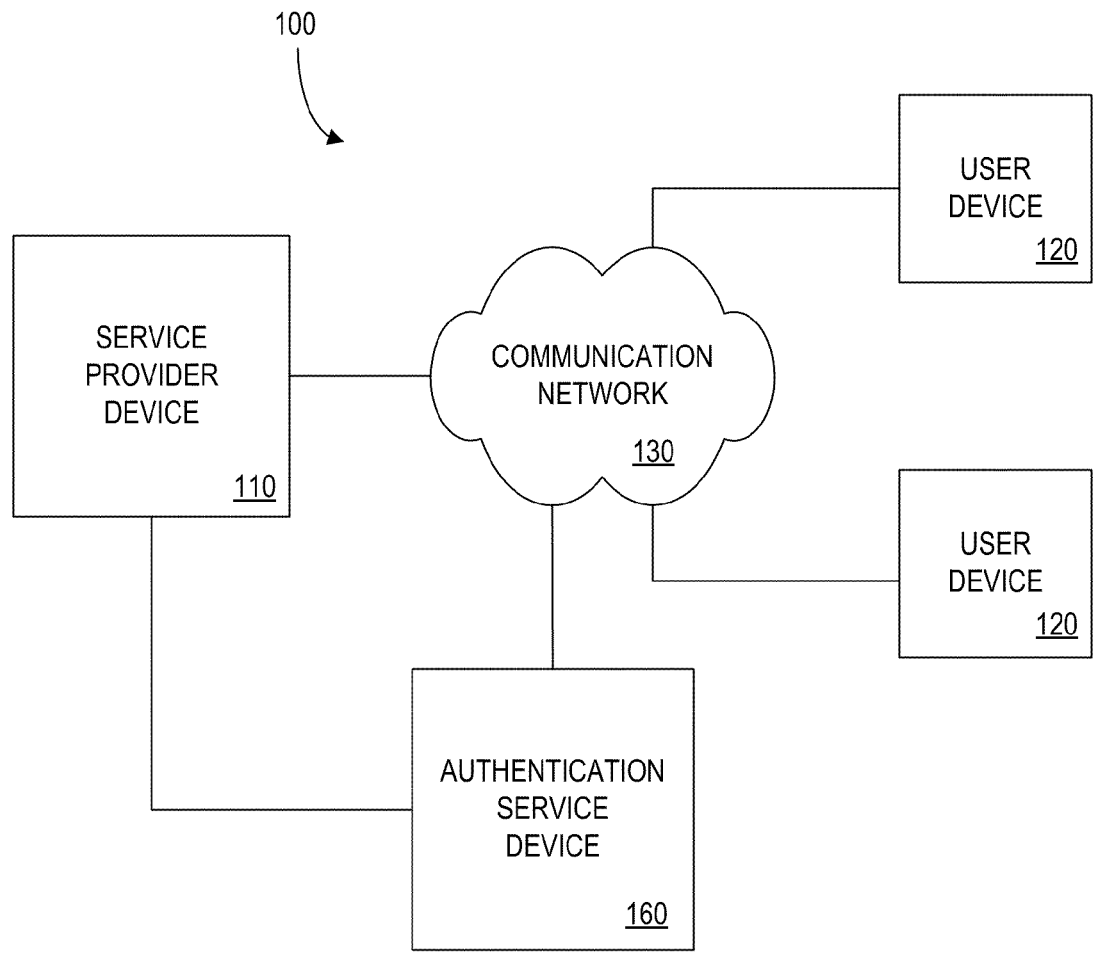
FIG. 1 is a block diagram representation of a system that may be provided according to some embodiments.

To alleviate problems inherent in the prior art, the present invention introduces systems and methods wherein a user may be authenticated substantially in real-time and in the course of a registration transaction.

Some embodiments of the present invention are associated with a "user" who is seeking to access a product or service in which the user's identity (or information associated with the user) requires authentication. As used herein, the term "user" might refer to, for example, a person (or entity) who executes transactions with merchants or service providers. As used herein, the term "user account" might refer to, for example, any financial account associated with or controlled by the user to perform financial transactions. For example, a user account might be a bank account, a credit card account, a debit card account, a prepaid account, a loan account, or the like. As used herein, the term "historical transactions" might refer to, for example, any transactions conducted by the user involving the user account. For example, a user having a credit card account may have a number of historical transactions (or transactions which were conducted using the credit card account) in any given time period. These, and other, terms will be used to describe features of some embodiments of the present invention by reference to the following detailed description of the invention, the appended claims and the drawings provided herewith.

For purposes of illustrating features of some embodiments of the present invention, a simple example will now be introduced and referenced throughout the disclosure. In the illustrative example, a customer (named "John Doe") wishes to sign up for a money transfer service so that he can easily send money to a relative in the Philippines. John Doe has a bank account at his local bank, and he has a MasterCard branded credit card that is issued by his bank and that he uses frequently for purchases. The money transfer service that John wishes to sign up for uses the authentication techniques of the present invention. The money transfer service provider is called "Money Transfer Co.", and Money Transfer Co. has engaged the services of an authentication service called "Authentication Co." which offers authentication services pursuant to the present invention. Money Transfer Co. requires that all users who wish to send funds using Money Transfer Co.'s services register an active bank account or credit card account so that funds can be debited from one of those accounts to fund any money transfers initiated by the user. John Doe wants to send money to his relative quickly, and chooses to register his credit card account so that Money Transfer Co. can debit funds from John's credit card account to make the transfer. In the following detailed description, we will refer to this illustrative example to show how John, Money Transfer Co., and Authentication Co. use features of the present invention to authenticate John's account so that it can be quickly linked and used to conduct transactions. Those skilled in the art will recognize that this example is illustrative and not limiting and is provided purely for explanatory purposes.

Turning now in detail to the drawings, FIG. 1 is a block diagram representation of a system 100 that may be provided according to some embodiments. The system 100 includes a service provider device 110 in communication with other devices via a communication network 130. The service provider device 110 may be associated with, for example, a company or service that offers services or products to consumers and which requires users to authenticate themselves or their ownership of a financial account in order to obtain access to goods or services offered by the service provider (or a entity associated with the service provider). For example, the service provider device 110 may be associated with an entity that provides funds transfer services and which requires a user to provide a funding account in order to send funds using the services. Embodiments of the present invention allow the service provider to quickly and accurately authenticate a new user's account so that the new user may quickly gain access to the service provider's services.

As used herein, devices (including the service provider device 110) may communicate, for example, via a communication network 130 such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a cable television network, or an Internet Protocol (IP) network such as the Internet, an intranet or an extranet. Moreover, as used herein, communications include those enabled by wired or wireless technology. Although a single service provider device 110 and communication network 130 are shown in FIG. 1, any number of such devices and networks may be included in the system 100. Similarly, any number of the other devices described herein may be included in the system 100 according to embodiments of the present invention.

The service provider device 110 might also communicate with, for example, one or more user devices 120. For example, the service provider device 110 might communicate (via the network) with a remote Personal Computer (PC), laptop computer, hand-held computer, or other computing device associated with a consumer. Although some embodiments are described with respect to information exchanged via a Web site, according to other embodiments information is instead exchanged, for example, via: a telephone, an Interactive Voice Response Unit (IVRU), electronic mail, a cable network interface, and/or a wireless communication system. The user device 120 may be any device capable of performing various functions described herein. The user device 120 might be, for example, a Personal Digital Assistant (PDA) or a wired or wireless telephone. A consumer may use the user device 120, for example, register to access or utilize services offered by the service provider device 110, and may also use the device 120 to complete an authentication process pursuant to embodiments of the present invention.

According to some embodiments, the service provider device 110 also communicates with an authentication service device 160. For example, the service provider device 110 may transmit or forward data about the user to the authentication service device 160 so that the authentication service device 160 may operate to authenticate the user (or the user's account). For example, the service provider device 110 may transmit information identifying the user and one or more user accounts (e.g., via a redirect, via an HTTP post, or the like). The authentication service device 160 may use this information to perform look ups and other processing (to be described further below) and may then transmit an authentication result to the service provider device 110.

Although a separate service provider device 110 and authentication service device 160 are shown in FIG. 1, some or all of these devices may be incorporated in a single device. In some embodiments, which will be described further below, the authentication service device 160 may store, or have access to, a historical transaction database which includes transaction data for a large number of financial transactions. For example, in some embodiments, the historical transaction database includes transaction data extracted from credit card, debit card, and other financial transactions which have been processed over a payment network, such as the MasterCard® International Incorporated BankNet® payment network. In some embodiments, the authentication service device 160 has access to payment data from one or more payment networks, thereby increasing the number and type of user accounts that can be authenticated. Further details of a historical transaction database which may be used in some embodiments will be provided below in conjunction with a discussion of FIG. 5.

In the illustrative example introduced above, John Doe may operate a user device 120 to interact with Money Transfer Co. (who operates service provider device 110). Money Transfer Co. may provide a registration Web site that John Doe interacts with over the Internet to sign up and conduct the registration process. During the registration process, John Doe may be asked to link or associate a funding account to his new account with Money Transfer Co. so that money transfers can be funded from the funding account. Pursuant to some embodiments, the linking or registration of the account may require authentication, or proof, that John owns the account he is trying to link. In the illustrative example, John chooses to link his MasterCard® credit card to his new account at Money Transfer Co. This linking requires authentication that John actually owns or controls the MasterCard® credit card he is trying to link. Money Transfer Co., using the services provided by Authentication Co., uses features of the present invention to authenticate the ownership.

Figure 2:
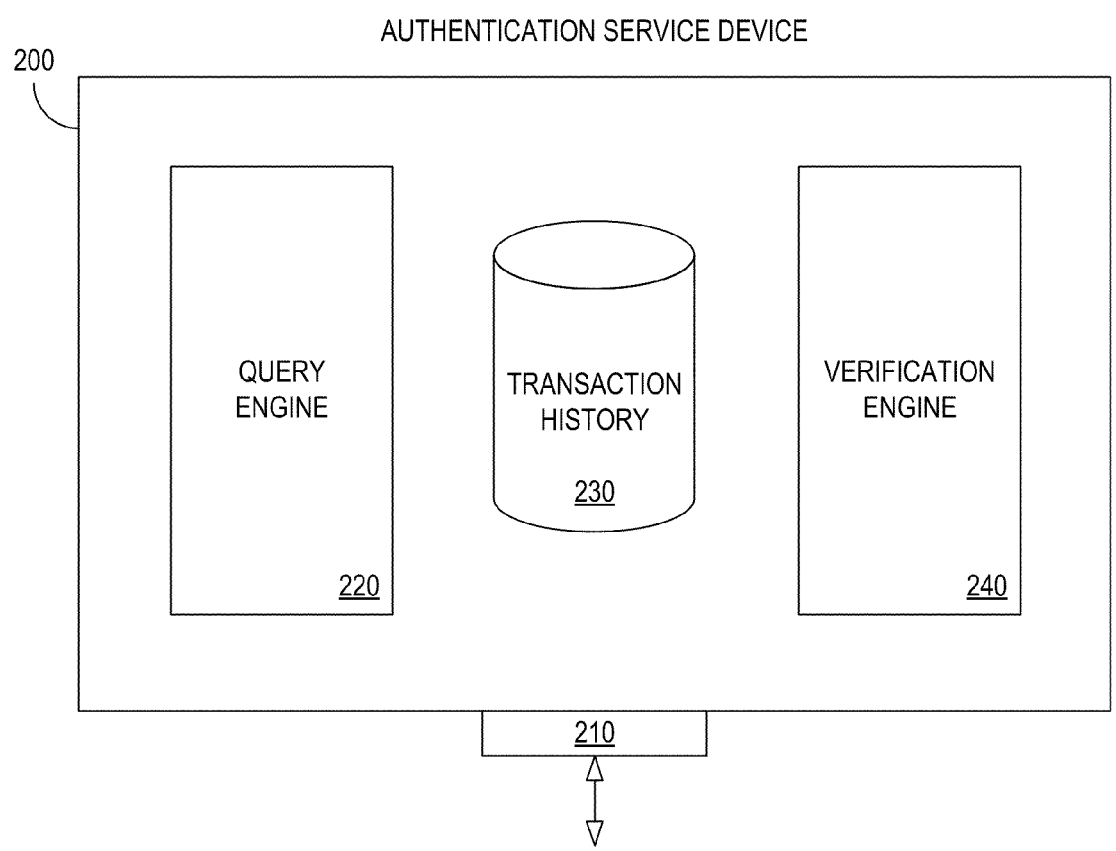
FIG. 2 is a block diagram of an authentication service device according to some embodiments.

FIG. 2 is a block diagram of an authentication service device 200, such as the device 160 described with respect to FIG. 1, according to some embodiments. In this case, the authentication service device 200 includes a communication port 210 to exchange data over a network to facilitate communication with, for example, other devices (such as service provider devices 110 and user devices 120). Note that numerous ports 210 may be provided (to allow for simultaneous communication with a number of other devices) and may be preferably configured with hardware suitable to physically interface with desired external devices and/or network connections. For example, the communication port 210 may comprise an Ethernet connection to a local area network through which the authentication service device 200 may receive and transmit information over the Internet and/or over private or proprietary networks.

In addition, the authentication service device 200 includes a query engine 220 and a verification engine 240 that may be constituted by one or more conventional processors. The engines 220, 240 operate to execute processor-executable process steps so as to control the authentication service device 200 to provide desired functionality. The authentication service device 200 further includes a storage device 230 to store transaction history information. Note that the engines 220, 240 and storage device 230 may be co-located with, or remote from, the authentication service device 200.

Figure 3:
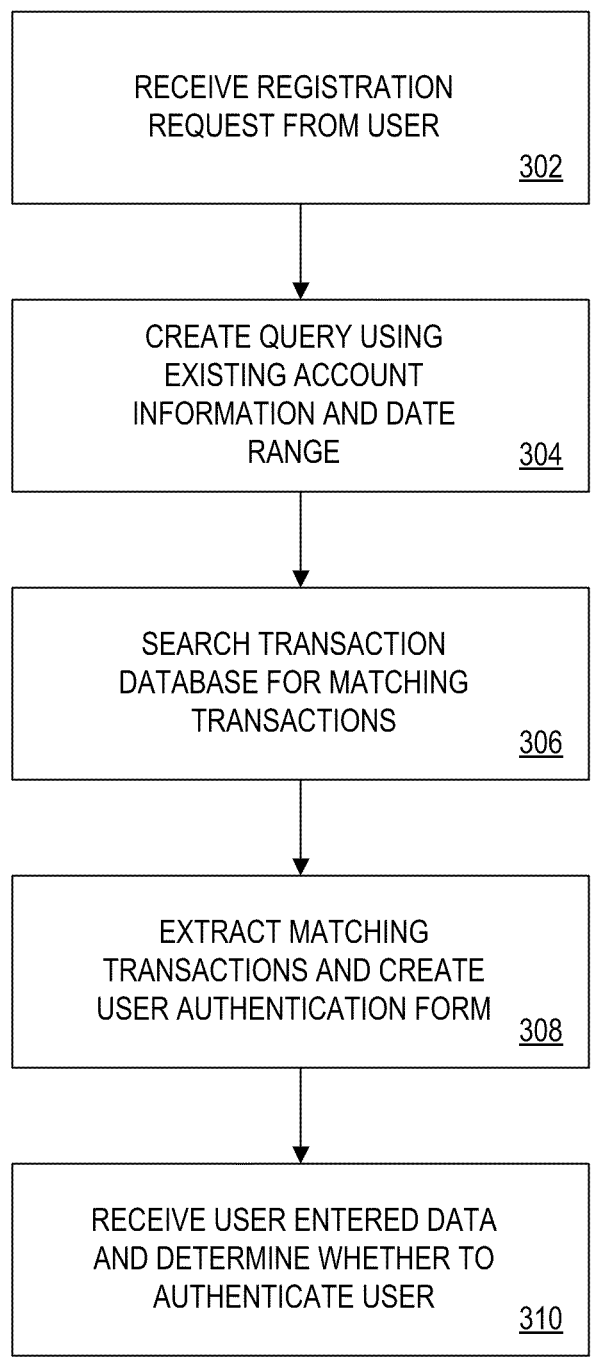
FIG. 3 is a flow chart that illustrates a method that may be performed according to some embodiments.

The authentication service device 200 may operate in accordance with any of the embodiments described herein. By way of example only, FIG. 3 is a flow chart that illustrates a method that may be performed according to some embodiments. The flow charts in FIG. 3 and the other figures described herein do not imply a fixed order to the steps, and embodiments of the present invention can be practiced in any order that is practicable. Moreover, the methods may be performed by any of the devices described herein. The method shown in FIG. 3 may be performed, for example, by the service provider device 110 of FIG. 1 and/or the authentication service device 200 of FIG. 2. Note that the elements of FIG. 3 and the other FIGS. described herein may be performed by different parties. For example, each element might be performed by a different party (e.g., by a service provider, by an authentication service, by a financial institution, by a payment association, or any other agent or party). Moreover, any single element might be performed by multiple parties.

The authentication process 300 of FIG. 3 may begin at 302, where a user has submitted a registration request. Referring again to the illustrative example introduced above, processing at 302 occurs once John Doe (interacting with the Money Transfer Co. Website) has requested that his MasterCard® credit card be linked to his new Money Transfer Co. account. Processing at 302 involves receiving an account number from the user. In the illustrative example, John Doe provides the primary account number (or "PAN") from his MasterCard® credit card (e.g., the 16-digit number embossed or printed on the face of John's card). This information may be provided to the service provider device 110 which may then forward or redirect the information to the authentication service device 160 for processing.

At 304, the authentication service device 160 creates a query using the account number provided at 302. In some embodiments, the query is a date-based query defined based on business rules (or, in some embodiments, based on information provided by the user). For example, the query created may be to retrieve all transactions involving the account number over the past 2 weeks. Referring to the illustrative example, the query may be to retrieve all of the transactions conducted using John Doe's MasterCard® credit card over the last two weeks. A number of other query types may also be used to retrieve transactions made using the user's account (as will be described further below, it is desirable to retrieve one or more transactions that may be identified by the legitimate account owner so that the user can authenticate that he owns the account), for example, transactions conducted during a certain time period may be retrieved, transactions conducted at particular types of merchants may be retrieved, etc.

At 306, the transaction database is searched to identify transaction(s) that match the query parameters. For example, referring to the device of FIG. 2, processing at 306 may be performed by the authentication service device 200 by applying the query (generated at the query engine 220) to the transaction history database 230. Continuing the illustrative example introduced above, processing at 306 may involve searching for transactions involving John Doe's MasterCard® credit card over the last two weeks. In some embodiments, if the initial query results in no (or too few) transaction records, a second, expanded query may be attempted (e.g., over a larger span of time, etc.).

Processing continues at 308 where the matching transactions are extracted and are used to create a user authentication form or user interface. In some embodiments, this is performed under control of the authentication service device 200 which is in communication with the user device 120 over a network (e.g., the authentication service device 200 may be in direct communication with the user device 120 or may be in communication with a browser of the user device 120 via an iFrame or other HTML code hosted on a server associated with the service provider device 110. The authentication service device 200 may generate a dynamic HTML form using the historical transaction data retrieved from the historical transaction database 230 and based on rules established by the service provider. For example, each service provider 110 may require that their forms be presented and validated according to different rules (e.g., with different headers, different requirements for the number of transactions to be presented, etc.).

Figure 7:
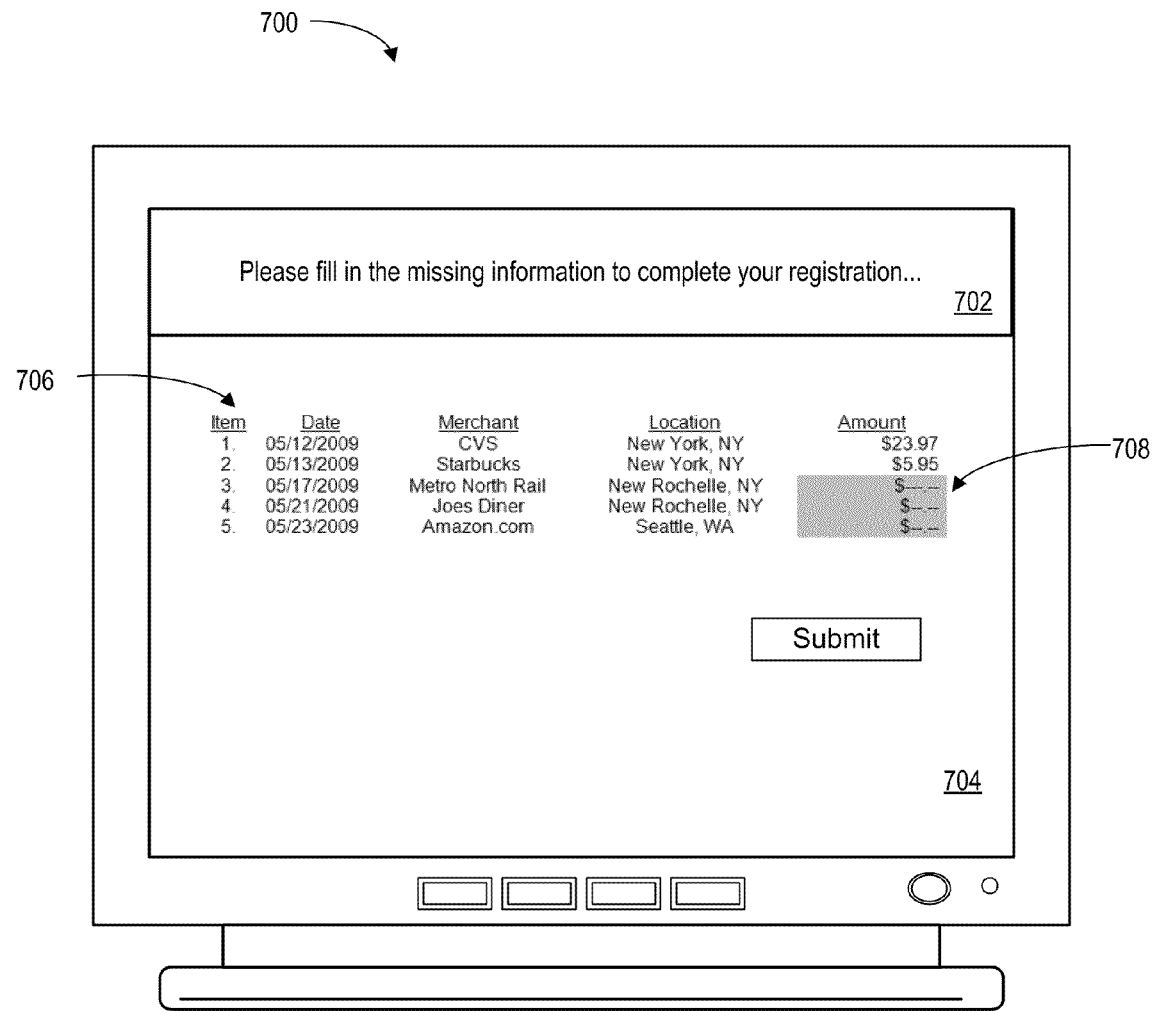
FIG. 7 is an illustrative user interface that may be used according to some embodiments.
Figure 8:
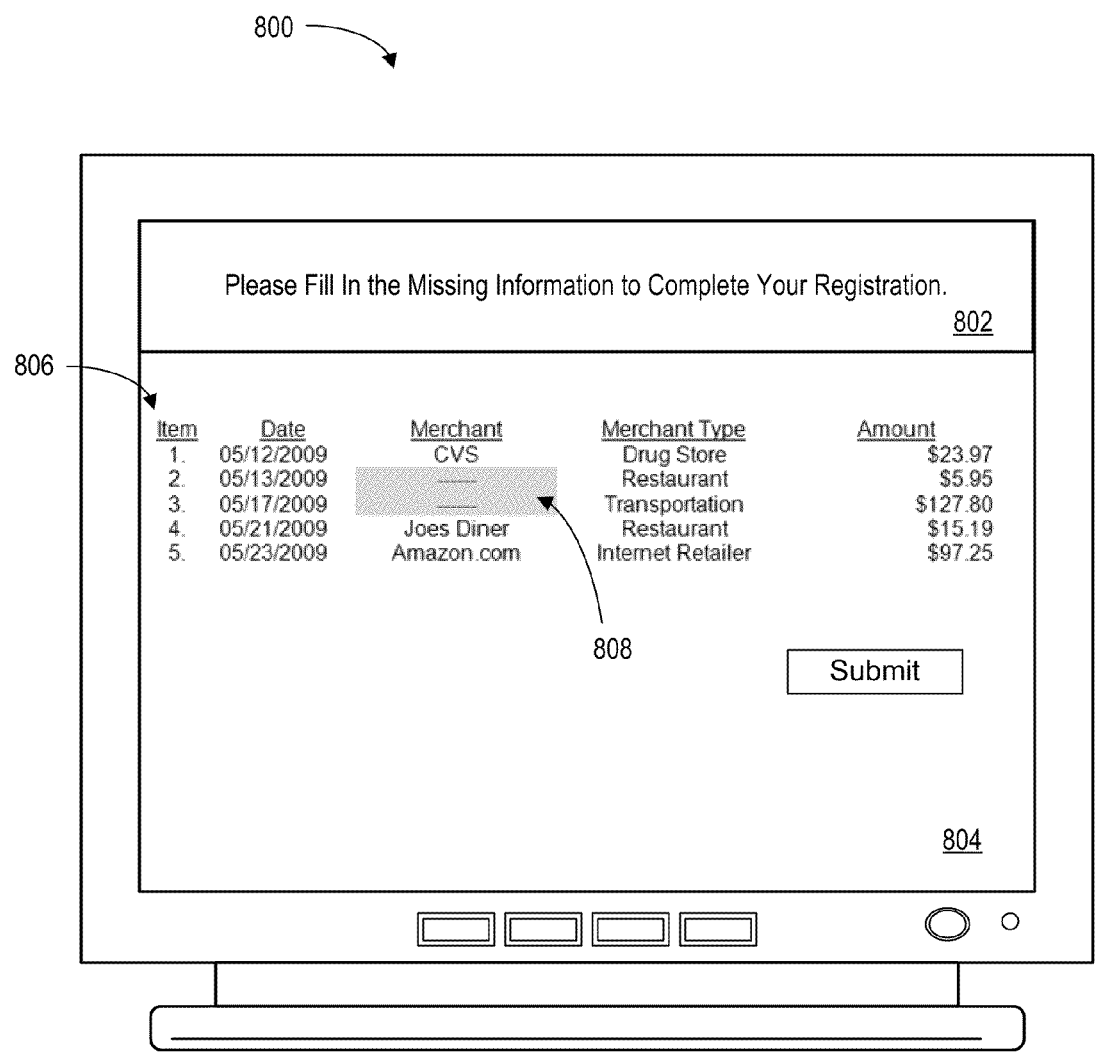
FIG. 8 is a further illustrative user interface that may be used according to some embodiments.

Examples of user authentication forms generated at 308 are shown in FIGS. 7 and 8. Referring first to FIG. 7, a user interface 700 is shown which includes a header area 702, and a form area 704. The form area 704 includes a table of historical transactions conducted by a user who is attempting to register for a service with a service provider. Each of the transactions include data retrieved from the historical transaction database 230 based on an account number provided by the user. In the illustrated user interface, information from five transactions are shown, with the transaction amount information for three of the transactions left blank. Pursuant to some embodiments, a user must enter the missing data at 708 to be authenticated.

In the user interface 800 of FIG. 8, a slightly different user authentication form is shown in which the same transaction details are shown, but all of the transaction amount information is filled out. In the form shown in FIG. 8, the user is prompted to provide the missing data at 808 (the names of two merchants).

Referring again to the illustrative example introduced above, processing at 308 involves John Doe being presented with a user authentication form which includes transaction data from transactions conducted using John Doe's MasterCard® credit card. John Doe must provide the missing data (such as the missing transaction amount data 708 in the form of FIG. 7, or the missing merchant name data 808 in the form of FIG. 8) in order to successfully prove that he is the owner of the MasterCard® credit card that he is attempting to register for use in the money transfer program.

Processing continues at 310 after the user clicks "submit" or otherwise submits her response to the user authentication form. Processing at 310 includes receiving the user entered data and determining whether to authenticate the user. This determination may be performed by the authentication service device 200 using the verification engine 240 to apply one or more verification rules which may be specified by individual service providers. For example, pursuant to some embodiments, a service provider may set variance thresholds to allow for some inaccuracy in data entered by the user. For example, a service provider may specify that a user must enter transaction amounts that are accurate to ±5% (or ±10%). Those skilled in the art will appreciate that other variances or rules may also be specified to account for a user's vague memory about certain transactions. If the user submitted data passes the verification rules, the user is consider to be authenticated and a "success" message may be transmitted to the service provider device 110. In some embodiments, session control may be returned to the service provider device 110 so that the service provider device can complete the registration process with the user.

Figure 4:
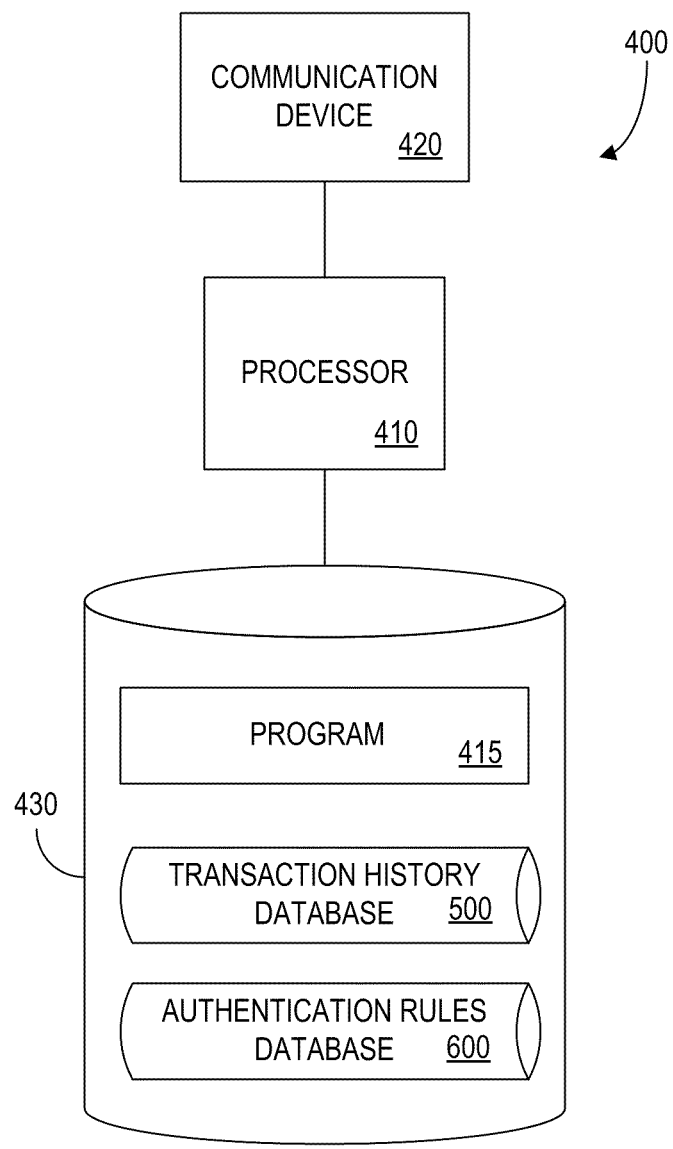
FIG. 4 is a block diagram of an apparatus according to some embodiments.

FIG. 4 is a block diagram of an apparatus 400 that may be descriptive of the devices shown in FIGS. 1 and/or 2 according to an embodiment of the present invention. The apparatus 400 comprises a processor 410, such as one or more INTEL® Pentium® processors, coupled to a communication device 420 configured to communicate via a communication network (not shown in FIG. 4). The communication device 420 may be used to communicate, for example, with service provider device 110 and/or user devices 120.

The processor 410 may also be in communication with a local input device (not shown in FIG. 4). The local input device may comprise, for example, a keyboard, a mouse or other pointing device, a switch, an infrared port, a docking station, and/or a touch screen. Such a local input device may be used, for example, to provide rules and threshold values associated with authentication rules (e.g., established or specified by service providers using the authentication service), or to perform maintenance or modification of queries or interfaces to obtain transaction history data. The processor 410 may also be in communication with a local output device (not shown in FIG. 4). The local output device may comprise, for example, a display (e.g., a computer monitor), a speaker, and/or a printer. The local output device may be used, for example, to generate reports and/or export information to be used to generate authentication rules or procedures.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 430 stores a program 415 for controlling the processor 410. The program 415 may be stored in a compressed, uncompiled and/or encrypted format. The program 415 may furthermore include other program elements, such as an operating system, a database management system, and/or device drivers used by the processor 410 to interface with peripheral devices.

The processor 410 performs instructions of the program 415, and thereby operates in accordance with the present invention. For example, the processor 410 may receive data associated with a user to be authenticated, and then use that data to query a transaction history database, and then present the data to the user in an interactive form according to the rules from the authentication rules database. The processor 410 may further arrange to transfer a success or fail message to the service provider so that the service provider device 110 may proceed accordingly.

As used herein, information may be "received" by or "transmitted" to, for example: (i) the apparatus 400 from remote device; or (ii) a software application or module within the apparatus 400 from another software application, module, or any other source.

Figure 6:
FIG. 6 is a portion of a tabular representation of a rules database according to some embodiments.

As shown in FIG. 4, the storage device 430 also stores a transaction history database 500 (described with respect to FIG. 5) and a authentication rules database 600 (described with respect to FIG. 6). Examples of databases that may be used in connection with the apparatus 400 will now be described in detail with respect to FIGS. 5 and 6.

Note that the illustrations and accompanying descriptions of the databases 500 and 600 presented herein are exemplary, and any number of other database arrangements could be employed besides those suggested by the figures. For example, as will be understood by those skilled in the art, the schematic illustrations shown herein and the following descriptions of the exemplary entries are merely examples of arrangements for stored representations of information. Any number of other arrangements may be employed besides that suggested by the tables shown. Similarly, the illustrated entries of the databases represent exemplary information only.

In a practical embodiment, the number of entries in the various databases may be in the thousands, or even in the millions. Moreover, for convenience of presentation, some databases are shown as having only several fields. However, in practice additional fields may be present, such as other fields for additional consumer contact information, transaction information, etc. Moreover, the various databases may generally be integrated with other databases used for other purposes in addition to those described herein. Also, note that the information stored in the database 500, 600 may be stored by (or at) and/or accessed by any number of different parties or locations (e.g., by an issuer, an account processor, and/or any other agent or party). For example a transaction history database 500 might be partially stored at a bankcard network and partially stored on an authentication service provider's system (and, when combined, form the complete transaction history database 500).

FIG. 5 is a portion of a tabular representation of a transaction history database 500 that may be stored at the apparatus 400 according to an embodiment of the present invention. The table includes entries identifying a number of completed (or historical) transactions conducted with various payment accounts. The table also defines fields 502, 504, 506, 508, 510, 512 for each of the entries. The fields specify: an account identifier 502; an account owner 504; a transaction identifier 506; a transaction date 508; a merchant 510; a merchant category 512 and a transaction amount 514. The information in the historical transaction database 500 may be created and updated, for example, based on information received from one or more payment processing networks or systems based on transactions conducted by consumers using those networks or systems.

The account identifier 502 may be, for example, an alphanumeric code associated with a particular payment account (e.g., in the case of a credit card or other payment card, the account identifier may be the PAN associated with the account). The account owner 504 may include information identifying the owner of the account identified in 502. The transaction identifier 506 may be an alphanumeric code uniquely identifying a particular transaction conducted using the payment account identified by the account identifier 502, and the transaction date 508, merchant 510, merchant category 512 and transaction amount 514 may be the details of the transaction identified by the transaction identifier 506. The transaction details may be the details received from a merchant point of sale location during a purchase transaction involving the account, for example, and may include additional or other information depending on the nature of the transaction, or on the payment network used to obtain the information.

FIG. 6 is a portion of a tabular representation of an authentication rules database 600 that may be stored at the apparatus 400 according to an embodiment of the present invention. The table includes entries identifying one or more rules to be applied by the authentication service device 160 to authenticate users on behalf of one or more service providers. In this manner, an authentication service device 160 may perform authentication services on behalf of more than one service provider, and each service provider 110 may specify different authentication rules. The table also defines fields 602, 604, 606, 608, 610, 612 and 614 for each of the entries. The fields specify: a service provider identifier 602; a web form identifier 604; a required minimum number of transactions 606; a query date range 608; an allowable variance 610; a number of retry(s) 612, and a redirect URL 614. The information in the authentication rules database 600 may be created and updated, for example, based on information received from service provider devices 110.

The service provider identifier 602 may be, for example, an alphanumeric code associated with a particular service provider that seeks to use authentication services provided by the authentication service. The web form identifier 604 may be a URL or other address specifying which web form is to be used to present the authentication questions to the user. Each service provider may have one or more web forms (which, for example, may be customized to include the service provider's logo and specific rules and instructions) that are used to present authentication questions to users who are being authenticated. In some embodiments, the authentication service device 160 may look up the appropriate web form identifier when a request to authenticate a user is received.

The minimum number of transactions 606 specifies the number of transactions that must be retrieved for each user and each account to be authenticated (e.g., if a service provider wants at least 5 historical transactions to be retrieved, the query created by the authentication service device will be designed to retrieve at least 5 queries associated with a user's account). Similarly, service providers may specify a desired date range to be retrieved by specifying a query date range

608. In some embodiments, a service provider may specify that the user being authenticated may specify a preferred date range. An allowable variance 610 may be specified to indicate how precise the user must be in her authentication response (e.g., a variance or threshold may be acceptable).

A number of retry(s) 612 may also be specified in the event a user fails the first authentication process. In the event of a success or failure, one or more redirect URLs 614 may be specified, so that control may be returned to the service provider after the authentication process has completed.

In this manner, embodiments allow a user to be authenticated substantially in real-time and during the course of a registration transaction. Embodiments allow service providers (who have a need to authenticate users) with an accurate and controlled means of authenticating users with a high degree of precision.

Although embodiments have been described in which users are presented with an accurate list of transactions (some of which may have redacted fields to be entered by the user), other embodiments may be provided in which one or more fields (or entire transactions) are bogus or made up. For example, the user may be asked to fill in the missing data for one or more actual transactions, and also to identify (or leave blank) the fields associated with bogus transactions. In some embodiments, the bogus transactions are randomly selected from a list of top merchants or from a list of likely bogus transactions. In such embodiments, the level of authentication may be increased, as the user is required to identify negative information as well as provide positive information.

In some embodiments, a user may be queried for additional information prior to identifying a set of transactions. For example, a user may be asked if they save or have transaction receipts (or have access to them). The user may be able to select a preferred time period in which he or she will be most likely able to accurately identify past transaction data. The system may then present only transactions falling within that preferred time period so that the user may have a greater chance to accurately identify all missing information during that period.

In some embodiments, the authentication system may present the user with a challenge list of historical transactions with both correct and incorrect transaction amounts. Bogus transactions may also be added to the challenge list and the user may then be asked to identify which transactions were initiated by the user (e.g., by clicking or selecting those transactions). Such embodiments may not require the user to enter an actual transaction amount, but simply select between invalid and valid transactions.

Embodiments allow the authentication of a user, substantially in real time, during a registration process. Further, embodiments allow such authentication to be performed for an entity (such as a service provider) which has no prior or direct business relationship with the user. The system authenticates that the user has access and control over an account purported to be their account with a minimal amount of information that needs to be provided by the user during the registration process (e.g., in some embodiments, all that is required is an account number). The system avoids the need to wait for further authentication, allowing a user to quickly access network services, and allowing a service provider to safely authenticate a user prior to providing access.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method, comprising:
   receiving, by an authentication service device, a registration request from a user, the user providing information identifying an account;
   querying a transaction database using said information identifying an account;
   identifying a set of transactions conducted using said account, each of said transactions having at least one transaction detail field;
   applying authentication rules required by the account provider, wherein the authentication rules include a minimum number of transactions requirement and a permissible number of user retry(s) requirement;
   presenting said set of transactions according to the minimum number of transactions requirement to said user with at least one of said transaction detail fields being redacted;
   presenting at least one bogus transaction to the user with at least one of the bogus transaction fields being redacted;
   prompting said user to provide positive information concerning said at least one of said redacted transaction detail fields and to provide negative information regarding the at least one redacted bogus transaction fields; and
   determining, by the authentication service device, to authenticate said user based on at least one positive information response, on at least one negative information response, and on the user satisfying the permissible number of retry(s) requirement.

2. The method of claim 1, wherein said prompting said user further comprises:
   presenting said set of transactions and the at least one bogus transaction to said user in a graphical user interface.

3. The method of claim 1, wherein said at least one of said transaction data fields and the at least one bogus transaction fields includes at least one of: a transaction amount, a transaction date, a merchant, and a merchant category.

4. The method of claim 1, wherein said at least one of said redacted transaction data fields is a transaction amount and said determining further comprises determining if said positive information response of said user is within a permitted variance from said redacted transaction amount.

5. The method of claim 1, wherein said transaction database includes a plurality of transactions conducted by a plurality of users.

6. The method of claim 1, wherein said transaction database includes a plurality of transactions conducted by a plurality of users with a plurality of accounts.

7. The method of claim 1, wherein said determining further comprises:
   comparing said positive information response of said user with a predetermined authentication threshold.

8. The method of claim 1, further comprising:
   generating an authentication confirmation message if said comparing meets a predetermined authentication parameter.

9. The method of claim 1, wherein said identifying further comprises:
   identifying a set of transactions within a predetermined date range.

10. An authentication apparatus, comprising:
    a processor; and
    a storage device in communication with said processor and storing instructions adapted to be executed by said processor to:

receive a registration request from a user, including information identifying an account associated with said user;

query a transaction database using said information identifying an account;

identify a set of transactions conducted using said account, each of said transactions having at least one transaction detail field;

apply authentication rules required by a provider of the account, wherein the authentication rules include a minimum number of transactions requirement and a permissible number of user retry(s) requirement;

cause said set of transactions to be presented to said user according to the minimum number of transactions requirement with at least one of said transaction detail fields being redacted;

cause at least one bogus transaction to be presented to the user with at least one of the bogus transaction field being redacted;

generate a message to prompt said user to provide positive information concerning said at least one of said redacted transaction detail fields and to provide negative information regarding the at least one redacted bogus transaction data fields field; and determine to authenticate said user based on at least one positive information response, on at least one negative information response, and on the user satisfying the permissible number of retry(s) requirement.

11. The apparatus of claim 10, wherein said storage device further stores at least one of: (i) a transaction history database, or (ii) a transaction rules database.

12. The apparatus of claim 10, further comprising:

a communication device coupled to said processor and adapted to communicate with at least one of: (i) a point of sale device, (ii) a user device, (iii) a service provider device.

13. A non-transitory computer-readable medium storing instructions adapted to be executed by a processor to perform a method of authenticating a user, said method comprising:

receiving a registration request from a user, the user providing information identifying an account;

querying a transaction database using said information identifying an account;

identifying a set of transactions conducted using said account, each of said transactions having at least one transaction detail field;

applying authentication rules required by the account provider, wherein the authentication rules include a minimum number of transactions requirement and a permissible number of user retry(s) requirement;

presenting said set of transactions according to the minimum number of transactions requirement to said user with at least one of said transaction detail fields being redacted;

presenting at least one bogus transaction to the user with at least one bogus transaction field being redacted;

prompting said user to provide positive information concerning said at least one of said redacted transaction detail fields and to provide negative information regarding the at least one redacted bogus transaction fields; and determining to authenticate said user based on at least one positive information response, on at least one negative information response, and on the user satisfying the permissible number of retry(s) requirement.

14. The non-transitory computer-readable medium storing instructions adapted to be executed by a processor of claim 13, further comprising:

presenting said set of transactions to said user in a graphical user interface.

15. The non-transitory computer-readable medium storing instructions adapted to be executed by a processor of claim 13, wherein said at least one of said transaction data fields and the at least one bogus transaction fields includes at least one of: a transaction amount, a transaction date, a merchant, and a merchant category.

16. The non-transitory computer-readable medium storing instructions adapted to be executed by a processor of claim 13, wherein said at least one of said redacted transaction data fields is a transaction amount and said determining further comprises determining if said positive information response of said user is within a permitted variance from said redacted transaction amount.

17. The non-transitory computer-readable medium storing instructions adapted to be executed by a processor of claim 13, wherein said transaction database includes a plurality of transactions conducted by a plurality of users.

18. The non-transitory computer-readable medium storing instructions adapted to be executed by a processor of claim 13, wherein said determining further comprises:

comparing said positive information response of said user with said redacted transaction detail fields and with a predetermined authentication threshold.

\* \* \* \* \*